United States Patent
Iwasaki

(10) Patent No.: US 11,427,123 B2
(45) Date of Patent: Aug. 30, 2022

(54) VEHICLE LAMP SYSTEM

(71) Applicant: KOITO MANUFACTURING CO., LTD., Tokyo (JP)

(72) Inventor: Jun Iwasaki, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 201 days.

(21) Appl. No.: 16/757,618

(22) PCT Filed: Oct. 18, 2018

(86) PCT No.: PCT/JP2018/038779
§ 371 (c)(1),
(2) Date: Apr. 20, 2020

(87) PCT Pub. No.: WO2019/078287
PCT Pub. Date: Apr. 25, 2019

(65) Prior Publication Data
US 2020/0324691 A1    Oct. 15, 2020

(30) Foreign Application Priority Data
Oct. 19, 2017 (JP) .............................. JP2017-202458

(51) Int. Cl.
*B60Q 1/34* (2006.01)
*B60Q 1/26* (2006.01)
*B60Q 1/00* (2006.01)

(52) U.S. Cl.
CPC ........... *B60Q 1/346* (2013.01); *B60Q 1/2615* (2013.01); *B60Q 1/0047* (2013.01)

(58) Field of Classification Search
CPC ..... B60Q 1/0047; B60Q 1/2615; B60Q 1/346
See application file for complete search history.

(56) References Cited

U.S. PATENT DOCUMENTS

| | | |
|---|---|---|
| 2016/0167648 A1 | 6/2016 | James et al. |
| 2017/0225567 A1 | 8/2017 | Tsuda |
| 2018/0118099 A1 | 5/2018 | Kunii et al. |
| 2018/0361919 A1 | 12/2018 | Sorokin |
| 2019/0111784 A1 | 4/2019 | Tsuda |

(Continued)

FOREIGN PATENT DOCUMENTS

| | | |
|---|---|---|
| DE | 102015225409 A1 | 6/2017 |
| DE | 202017103902 U1 | 7/2017 |
| EP | 2993083 A1 | 3/2016 |

(Continued)

OTHER PUBLICATIONS

Extended European Search Report issued in corresponding European Application No. 18867672.0; dated Jun. 8, 2021 (8 pages).

(Continued)

*Primary Examiner* — Thomas M Sember
(74) *Attorney, Agent, or Firm* — Osha Bergman Watanabe & Burton LLP

(57) ABSTRACT

This vehicle lamp system, which is used together with a vehicle control unit that controls the travel state of a vehicle and a mode determination unit that can determine an automatic driving mode of another vehicle, comprises a lamp mounted on the vehicle, and a lamp control unit which, depending on the mode signal outputted by the mode determination unit, controls the lamp in different ways (for example, displaying an arrow with road surface rendering).

12 Claims, 12 Drawing Sheets

(56) References Cited

U.S. PATENT DOCUMENTS

2019/0248277 A1    8/2019   Kunii et al.

FOREIGN PATENT DOCUMENTS

| | | |
|---|---|---|
| EP | 3216653 A1 | 9/2017 |
| JP | H09277887 A | 10/1997 |
| JP | 2006260000 A | 9/2006 |
| JP | 2016131365 A | 7/2016 |
| JP | 2017129937 A | 7/2017 |
| KR | 20170083295 A | 7/2017 |
| WO | 2016068273 A1 | 5/2016 |
| WO | 2016163294 A1 | 10/2016 |

OTHER PUBLICATIONS

International Search Report issued in corresponding International Application No. PCT/JP2018/038779, dated Dec. 25, 2018 (1 page).
Written Opinion of the International Searching Authority issued in corresponding International Application No. PCT/JP2018/038779, dated Dec. 25, 2018 (4 pages).

VEHICLE LAMP SYSTEM

TECHNICAL FIELD

The present invention relates to a vehicle lamp system.

BACKGROUND ART

Currently, research on automatic driving technology of an automobile has been actively performed in each country, and legislation for enabling a vehicle to travel on a public road in an automatic driving mode has been studied in each country. Here, the automatic driving mode refers to a mode in which the traveling of the vehicle is automatically controlled. On the other hand, a manual driving mode refers to a mode in which the traveling of the vehicle is controlled by a driver. In an automatic driving vehicle, the traveling of the vehicle is automatically controlled by a computer.

In this way, in the future, it is expected that (i) a vehicle that is traveling in an automatic driving mode (hereinafter, referred to as an automatic driving vehicle) and (ii) a vehicle that is traveling in a manual driving mode (hereinafter, referred to as a manual driving vehicle) will coexist on the public road.

CITATION LIST

Patent Literature

Patent Literature 1: JP-A-H9-277887

SUMMARY OF INVENTION

Technical Problem

Therefore, an object of the present invention is to provide a vehicle lamp system that can be suitably used in a situation where the automatic driving vehicle and the manual driving vehicle coexist on the public road.

Solution to Problem

In order to solve the above problem, the vehicle lamp system of the present invention is configured to be used together with a vehicle control unit configured to control a traveling state of a vehicle and with a mode determination unit configured to determine an automatic driving mode of another vehicle. The vehicle lamp system comprises a lamp configured to be mounted on the vehicle, and a lamp control unit configured to control the lamp in a different aspect in accordance with a mode signal output by the mode determination unit.

Advantageous Effects of Invention

According to the present invention, it is possible to provide the vehicle lamp system that can be suitably used in the situation where the automatic driving vehicle and the manual driving vehicle coexist on the public road.

DESCRIPTION OF EMBODIMENTS

Figure 1A:
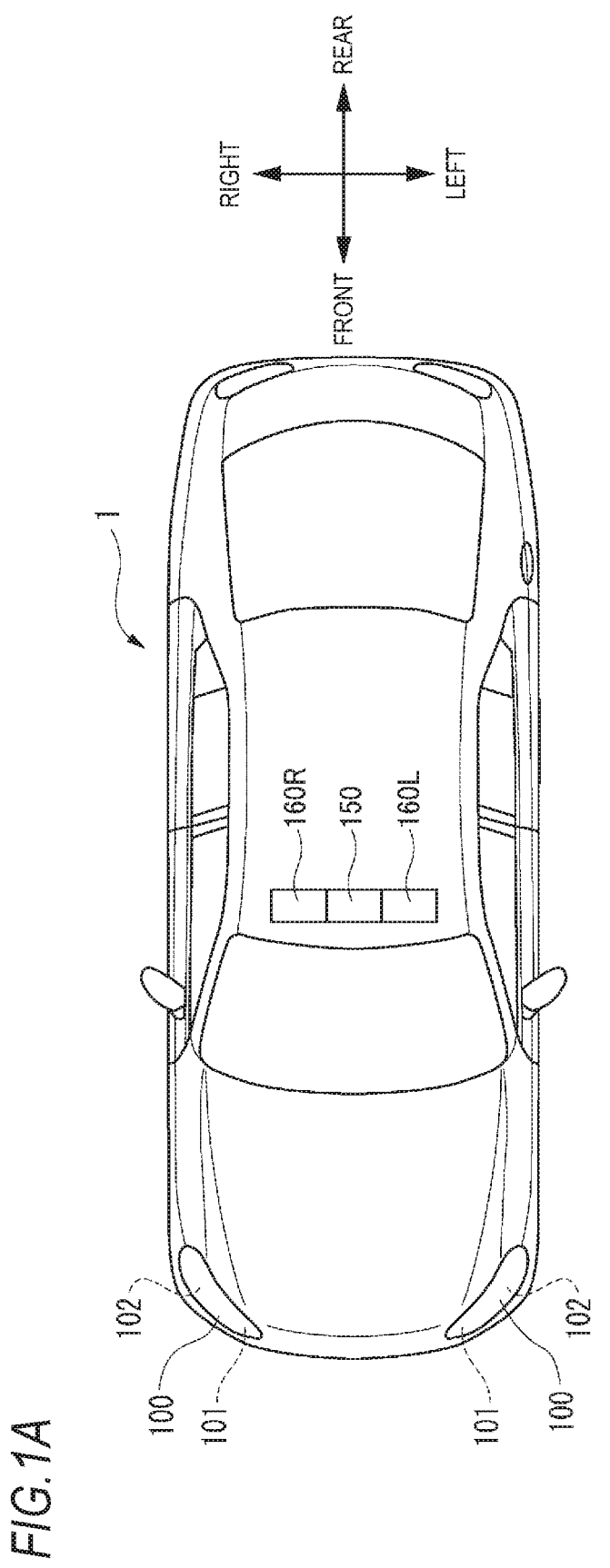
FIG. 1A is a top view of a vehicle including a vehicle lamp system according to an embodiment of the present invention.

Hereinafter, an embodiment of the present invention (hereinafter, referred to as a present embodiment) will be described with reference to the drawings. Descriptions of members having the same reference numerals as members that are already described in the description of the present embodiment will be omitted for convenience of description.

In the description of the present embodiment, a "left-right direction", a "front-rear direction", and an "upper-lower direction" will be referred to as appropriate for convenience of description. These directions are relative directions set for a vehicle 1 shown in FIGS. 1A and 1B. Here, the "upper-lower direction" is a direction including an "upper direction" and a "lower direction". The "front-rear direction" is a direction including a "front direction" and a "rear direction". The "left-right direction" is a direction including a "left direction" and a "right direction".

Figure 1B:
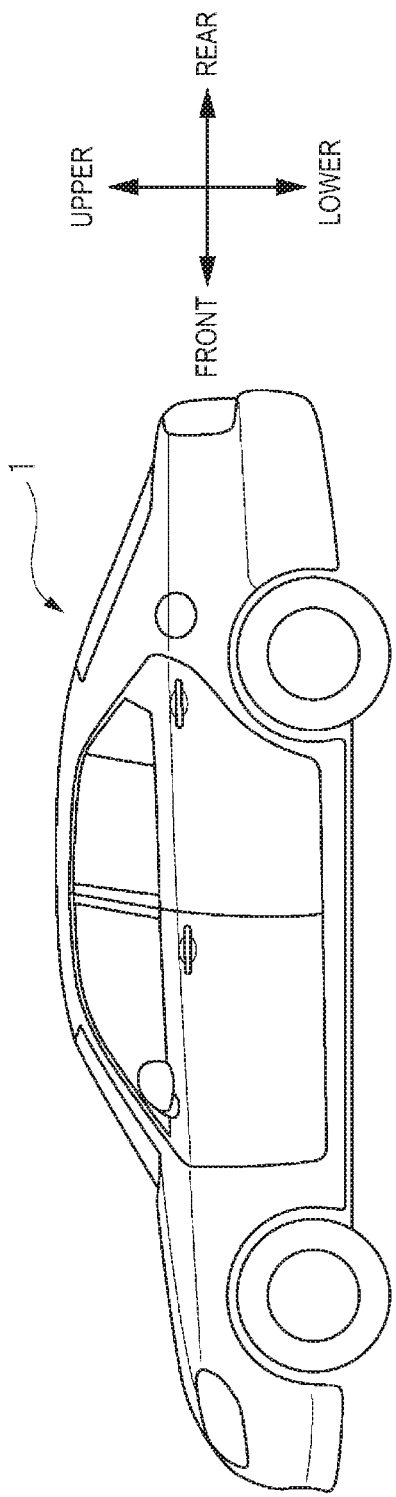
FIG. 1B is a side view of the vehicle including the vehicle lamp system according to the embodiment of the present invention.

FIGS. 1A and 1B show the vehicle 1 on which a vehicle lamp system according to the present embodiment is mounted. FIG. 1A shows a top view of the vehicle 1. FIG. 1B shows a side view of the vehicle 1. The vehicle 1 is an automobile that can travel in an automatic driving mode. In the vehicle 1, lamp units 100 in which headlamps (HL) 101 are built are mounted in left-and-right front portions. A road surface drawing lamp 102 (an example of a lamp) is built in the lamp unit 100 together with the headlamp 101.

On the vehicle 1, an identification lamp (hereinafter, referred to as an ID lamp) 150 (an example of an automatic driving lamp) and signaling lamps 160R and 160L are mounted on a roof.

The ID lamp 150 is a lamp indicating that the vehicle 1 is in the automatic driving mode. In the present embodiment, the ID lamp 150 is provided at a center portion of the vehicle 1 in the left-right direction.

The signaling lamps 160R and 160L are lamps that transmit an intention (will) of the vehicle 1 in the automatic driving mode to a third party on a road such as another vehicle or a pedestrian. The signaling lamp 160R is disposed on a right side of the ID lamp 150. The signaling lamp 160L is disposed on a left side of the ID lamp 150. The signaling lamps 160R and 160L are symmetrically attached with respect to a centerline that extends in the front-rear direction of the vehicle 1.

Figure 2:
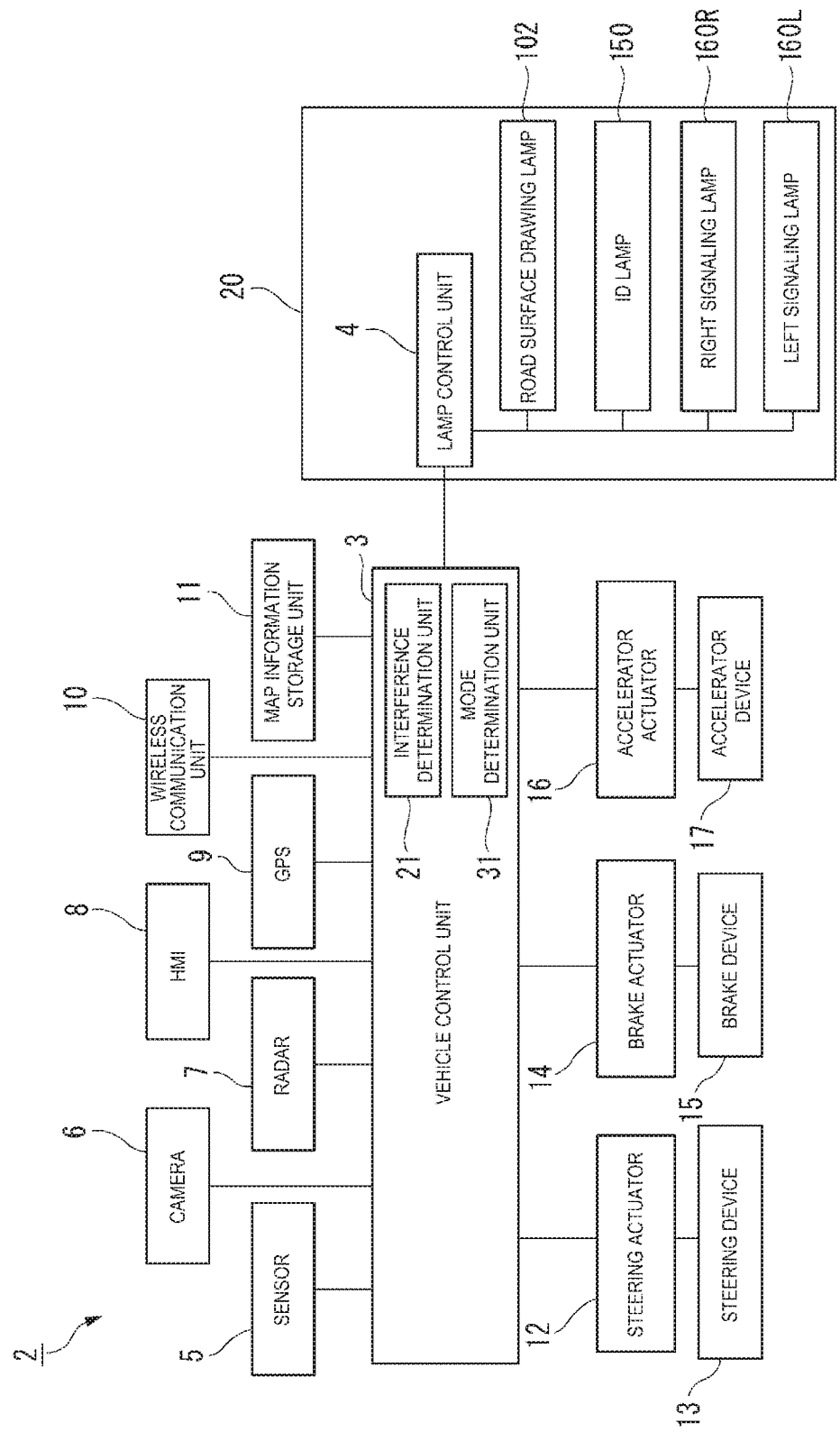
FIG. 2 is a block diagram of a vehicle system and the vehicle lamp system.

FIG. 2 shows a block diagram of a vehicle system 2 and a vehicle lamp system 20 that are mounted on the vehicle 1. First, the vehicle system 2 will be described with reference to FIG. 2. As shown in FIG. 2, the vehicle system 2 includes a vehicle control unit 3, a sensor 5, a camera 6, a radar 7, a human machine interface (HMI) 8, a global positioning system (GPS) 9, a wireless communication unit 10, and a map information storage unit 11. Further, the vehicle system 2 includes a steering actuator 12, a steering device 13, a brake actuator 14, a brake device 15, an accelerator actuator 16, and an accelerator device 17.

The vehicle control unit 3 includes an electronic control unit (ECU). The electronic control unit includes (i) a processor such as a central processing unit (CPU), (ii) a read only memory (ROM) in which various vehicle control programs are stored, and (iii) a random access memory (RAM) in which various pieces of vehicle control data is temporarily stored. The processor loads a program designated from the various vehicle control programs stored in the ROM on the RAM, and executes various processes in cooperation with the RAM.

The sensor 5 includes an acceleration sensor, a speed sensor, a gyro sensor, and the like. The sensor 5 detects a traveling state of the vehicle 1 and outputs traveling state information to the vehicle control unit 3. The sensor 5 may further include a seating sensor that detects whether a driver is sitting on a driving seat, a face direction sensor configured to detect a direction of a face of the driver, an outside weather sensor configured to detect an outside weather state, a human sensor configured to detect whether a person exists in the vehicle, and the like. Further, the sensor 5 may include an illuminance sensor configured to detect illuminance of a surrounding environment of the vehicle 1.

The camera 6 is a camera including, for example, an imaging element such as a charge-coupled device (CCD) or a complementary MOS (CMOS). The camera 6 is a camera configured to detect visible light or an infrared camera configured to detect infrared rays. The radar 7 is a millimeter-wave radar, a microwave radar, a laser radar, or the like. The camera 6 and the radar 7 is configured to detect the surrounding environment of the vehicle 1 (another vehicle, a pedestrian, a road shape, a traffic sign, an obstacle, and the like) and output surrounding environment information to the vehicle control unit 3.

The HMI 8 includes an input unit that receives an input operation from the driver and an output unit that outputs traveling information and the like to the driver. The input unit includes a steering wheel, an accelerator pedal, a brake pedal, a driving mode switching switch configured to switch a driving mode of the vehicle 1, and the like. The output unit is a display configured to display various pieces of traveling information.

The GPS 9 is configured to acquire current position information of the vehicle 1 and output the acquired current position information to the vehicle control unit 3. The wireless communication unit 10 is configured to receive traveling information of another vehicle around the vehicle 1 from another vehicle, and transmit the traveling information of the vehicle 1 to another vehicle (vehicle-to-vehicle communication). Further, the wireless communication unit 10 is configured to receive infrastructure information from infrastructure equipment such as a traffic light or a marker lamp, and transmit the traveling information of the vehicle 1 to the infrastructure equipment (road-to-vehicle communication). The map information storage unit 11 is an external storage device such as a hard disk drive in which map information is stored. The map information storage unit 11 is configured to output the map information to the vehicle control unit 3.

The vehicle control unit 3 controls traveling of the vehicle 1 based on external information of the vehicle 1 acquired from the sensor 5, the camera 6, the GPS 9, the wireless communication unit 10, the map information storage unit 11, and the like. In order to control the traveling of the vehicle 1, the vehicle control unit 3 is configured to calculate, based on the external information, for example, a future course of the vehicle 1 to be advancing on a road on which the vehicle 1 travels. Further, the vehicle control unit 3 is configured to calculate, for example, a future course of another vehicle (for example, an oncoming vehicle that passes through a narrow road) based on the external information. The future course of another vehicle may be received from another vehicle by the vehicle-to-vehicle communication.

The driving mode of the vehicle 1 includes a fully automatic driving mode, an advanced driving support mode, a driving support mode, and a fully manual driving mode.

When the vehicle 1 travels in the fully automatic driving mode or the advanced driving support mode, the vehicle control unit 3 automatically generates at least one of a steering control signal, an accelerator control signal, and a brake control signal based on external information such as the traveling state information, the surrounding environment information, the current position information, and the map information. The steering actuator 12 is configured to receive the steering control signal from the vehicle control unit 3 and control the steering device 13 based on the received steering control signal. The brake actuator 14 is configured to receive the brake control signal from the vehicle control unit 3 and control the brake device 15 based on the received brake control signal. The accelerator actuator 16 is configured to receive the accelerator control signal from the vehicle control unit 3 and control the accelerator device 17 based on the received accelerator control signal. In this way, in these modes, the traveling of the vehicle 1 is automatically controlled by the vehicle system 2.

On the other hand, when the vehicle 1 travels in the driving support mode or the fully manual driving mode, the vehicle control unit 3 generates the steering control signal, the accelerator control signal, and the brake control signal in accordance with a manual operation of the driver on the accelerator pedal, the brake pedal, and the steering wheel. In this way, in these modes, since the steering control signal, the accelerator control signal, and the brake control signal are generated by the manual operation of the driver, the traveling of the vehicle 1 is controlled by the driver.

Next, the driving mode of the vehicle 1 will be described. In the fully automatic driving mode, the vehicle system 2 automatically executes all traveling control of steering control, brake control, and accelerator control, and the driver is not in a state where the vehicle 1 can be driven. In the advanced driving support mode, the vehicle system 2 automatically executes all the traveling control of the steering control, the brake control, and the accelerator control, and the driver does not drive the vehicle 1 although the driver is in a state where the vehicle 1 can be driven.

On the other hand, in the driving support mode, the vehicle system 2 automatically executes a part of the traveling control among the steering control, the brake control, and the accelerator control, and the driver drives the vehicle 1 with driving support of the vehicle system 2. In the fully manual driving mode, the vehicle system 2 does not automatically execute the traveling control, and the driver drives the vehicle 1 without the driving support of the vehicle system 2.

The driving mode of the vehicle 1 may be switched by operating the driving mode switching switch. In this case, the vehicle control unit 3 switches the driving mode of the vehicle 1 among the four driving modes (the fully automatic driving mode, the advanced driving support mode, the driving support mode, and the fully manual driving mode) in accordance with an operation of the driver on the driving mode switching switch. Further, the driving mode of the vehicle 1 may be automatically switched based on information about a travelable section where an automatic driving vehicle can travel and about a traveling prohibited section where the driving of the automatic driving vehicle is prohibited, or based on information about outside weather state. In this case, the vehicle control unit 3 switches the driving mode of the vehicle 1 based on these pieces of external information. Further, the driving mode of the vehicle 1 may be automatically switched by using the seating sensor, the face direction sensor, and the like. In this case, the vehicle control unit 3 switches the driving mode of the vehicle 1 based on output signals from the seating sensor and the face direction sensor.

Figure 3:
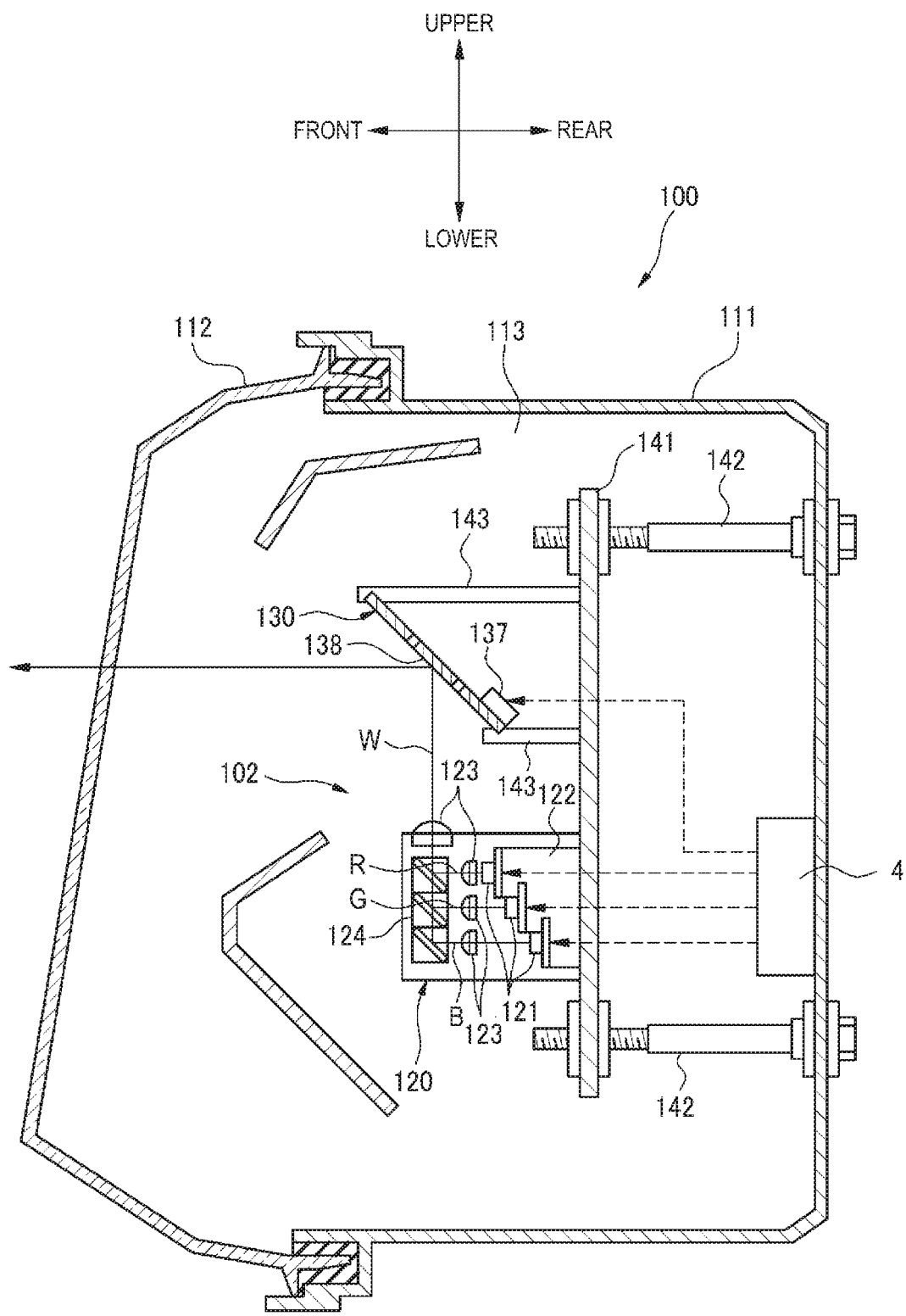
FIG. 3 is a vertical cross-sectional view of a road surface drawing lamp.

FIG. 3 is a vertical cross-sectional view showing a schematic configuration of the road surface drawing lamp 102 built in the lamp unit 100. As shown in FIG. 3, the lamp unit 100 includes a lamp body 111 including an opening portion on a vehicle front side, and a transparent front cover 112 attached to cover the opening portion of the lamp body 111. The road surface drawing lamp 102, a lamp control unit 4, and the like are housed in a lamp chamber 113 formed by the lamp body 111 and the front cover 112. Although not shown in the cross-sectional view of FIG. 3, similar to the road surface drawing lamp 102, the headlamp 101 is also housed in the lamp chamber 113.

The road surface drawing lamp 102 includes a light source unit 120 and a light distribution unit 130 that reflects light from the light source unit 120. The light source unit 120 and the light distribution unit 130 are supported at predetermined positions in the lamp chamber 113 by a support plate 141. The support plate 141 is attached to the lamp body 111 via aiming screws 142.

The light source unit 120 includes a plurality of (three in the present embodiment) light sources 121, a heat sink 122, a plurality of (four in the present embodiment) lenses 123, and a light collection unit 124. The light source unit 120 is fixed to a front surface of the support plate 141. The light sources 121 are electrically connected to the lamp control unit 4.

The light distribution unit 130 includes a terminal unit 137 and a reflection mirror 138. A positional relationship between the light distribution unit 130 and the light source unit 120 is determined such that laser light emitted from the light source unit 120 can be reflected toward a front side of the road surface drawing lamp 102 via the reflection mirror 138. The light distribution unit 130 is fixed to tip ends of protruding portions 143 that protrude to a front side from the front surface of the support plate 141. The terminal unit 137 is electrically connected to the lamp control unit 4.

The lamp control unit 4 is fixed to the lamp body 111 on a rear side of the support plate 141. A position where the lamp control unit 4 is provided is not limited to this position. The road surface drawing lamp 102 is configured such that an optical axis can be adjusted in a horizontal direction and a vertical direction by rotating the aiming screws 142 to adjust a posture of the support plate 141.

Figure 4:
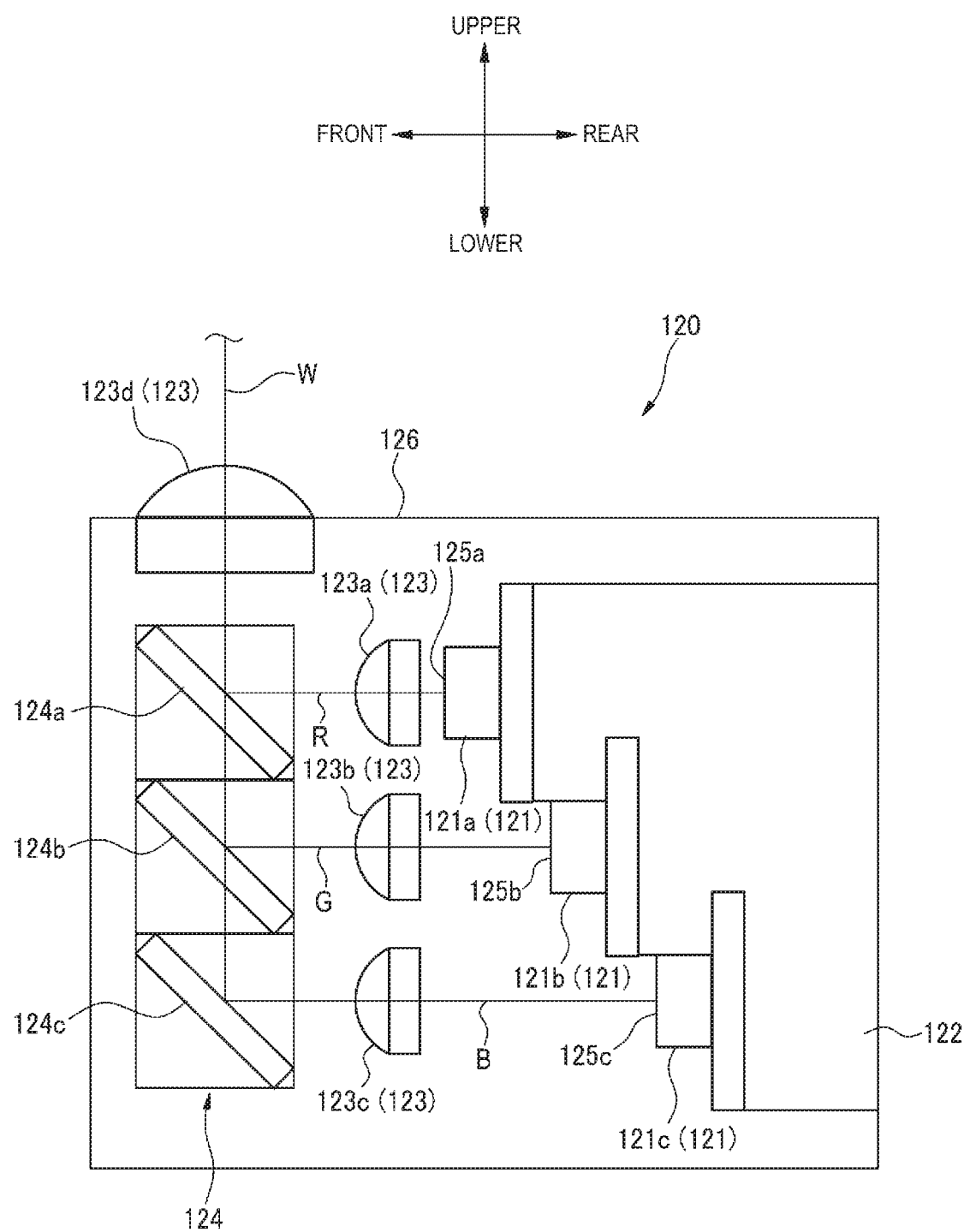
FIG. 4 is a side view showing a configuration of a light source unit of the road surface drawing lamp.

FIG. 4 is a side view of the light source unit 120 that constitutes the road surface drawing lamp 102. As shown in FIG. 4, the light source unit 120 includes a first light source 121a, a second light source 121b, a third light source 121c, the heat sink 122, a first lens 123a, a second lens 123b, a third lens 123c, a fourth lens 123d, and the light collection unit 124.

The first light source 121a is a light source that emits red laser light R. The first light source 121a includes a light-emitting element including a red laser diode. Similarly, the second light source 121b includes a green laser diode that emits green laser light G, and the third light source 121c includes a blue laser diode that emits blue laser light B. The first light source 121a, the second light source 121b, and the third light source 121c are arranged such that a laser light-emitting surface 125a, a laser light-emitting surface 125b, and a laser light-emitting surface 125c, which are respective light-emitting surfaces, are parallel to one another. The light-emitting element of each light source is not limited to the laser diode.

The first light source 121a to the third light source 121c are arranged such that the respective laser light-emitting surfaces 125a to 125c face the front side of the road surface drawing lamp 102, and are attached to the heat sink 122. The heat sink 122 is formed of a material having high thermal conductivity such as aluminum. The heat sink 122 is attached to the light source unit 120 in a state where a rear side surface of the heat sink 122 is in contact with the support plate 141 (see FIG. 3).

The first lens 123a to the fourth lens 123d include, for example, a collimating lens. The first lens 123a is provided on an optical path of the red laser light R between the first light source 121a and the light collection unit 124, converts the red laser light R emitted from the first light source 121a into parallel light, and emits the parallel light to the light collection unit 124. The second lens 123b is provided on an optical path of the green laser light G between the second light source 121b and the light collection unit 124, converts the green laser light G emitted from the second light source 121b into parallel light, and emits the parallel light to the light collection unit 124.

The third lens 123c is provided on an optical path of the blue laser light B between the third light source 121c and the light collection unit 124, converts the blue laser light B emitted from the third light source 121c into parallel light, and emits the parallel light to the light collection unit 124. The fourth lens 123d is fitted into an opening provided in an upper portion of a housing 126 of the light source unit 120. The fourth lens 123d is provided on an optical path of white laser light W (to be described below) between the light collection unit 124 and the light distribution unit 130 (see FIG. 3), converts the white laser light W emitted from the light collection unit 124 into parallel light, and emits the parallel light to the light distribution unit 130.

The light collection unit 124 collects the red laser light R, the green laser light G, and the blue laser light B to generate the white laser light W. The light collection unit 124 includes a first dichroic mirror 124a, a second dichroic mirror 124b, and a third dichroic mirror 124c.

The first dichroic mirror 124a is at least a mirror that reflects red light and transmits blue light and green light. The first dichroic mirror 124a is disposed to reflect the red laser light R, which passes through the first lens 123a, toward the fourth lens 123d. The second dichroic mirror 124b is at least a mirror that reflects the green light and transmits the blue light. The second dichroic mirror 124b is disposed to reflect the green laser light G, which passes through the second lens 123b, toward the fourth lens 123d. The third dichroic mirror 124c is at least a mirror that reflects the blue light. The third dichroic mirror 124c is disposed to reflect the blue laser light B, which passes through the third lens 123c, toward the fourth lens 123d.

A positional relationship among the first dichroic mirror 124a to the third dichroic mirror 124c is determined such that optical paths of the laser light reflected respectively by the first dichroic mirror 124a to the third dichroic mirror 124c are parallel to one another, and the laser light is collected and incident on the fourth lens 123d. In the present embodiment, the first dichroic mirror 124a to the third dichroic mirror 124c are arranged such that regions of the dichroic mirrors 124a to 124c irradiated with the laser light (reflection points of the laser light) are aligned in a straight line.

The blue laser light B emitted from the third light source 121c is reflected by the third dichroic mirror 124c and advances to a second dichroic mirror 124b side. The green laser light G emitted from the second light source 121b is reflected by the second dichroic mirror 124b toward a first dichroic mirror 124a side, and is superimposed on the blue laser light B transmitted through the second dichroic mirror 124b. The red laser light R emitted from the first light source 121a is reflected by the first dichroic mirror 124a toward a fourth lens 123d side, and is superimposed on collected light of the blue laser light B and the green laser light G that are transmitted through the first dichroic mirror 124a. As a result, the white laser light W is formed, and the formed white laser light W passes through the fourth lens 123d and advances to the light distribution unit 130.

Among the first light source 121a to the third light source 121c, the first light source 121a that emits the red laser light R is disposed at a position closest to the light collection unit 124, the third light source 121c that emits the blue laser light B is disposed at a position farthest from the light collection unit 124, and the second light source 121b that emits the green laser light G is disposed at an intermediate position. That is, the first light source 121a to the third light source 121c are arranged at positions closer to the light collection unit 124 as a wavelength of emitted laser light becomes longer.

Figure 5:
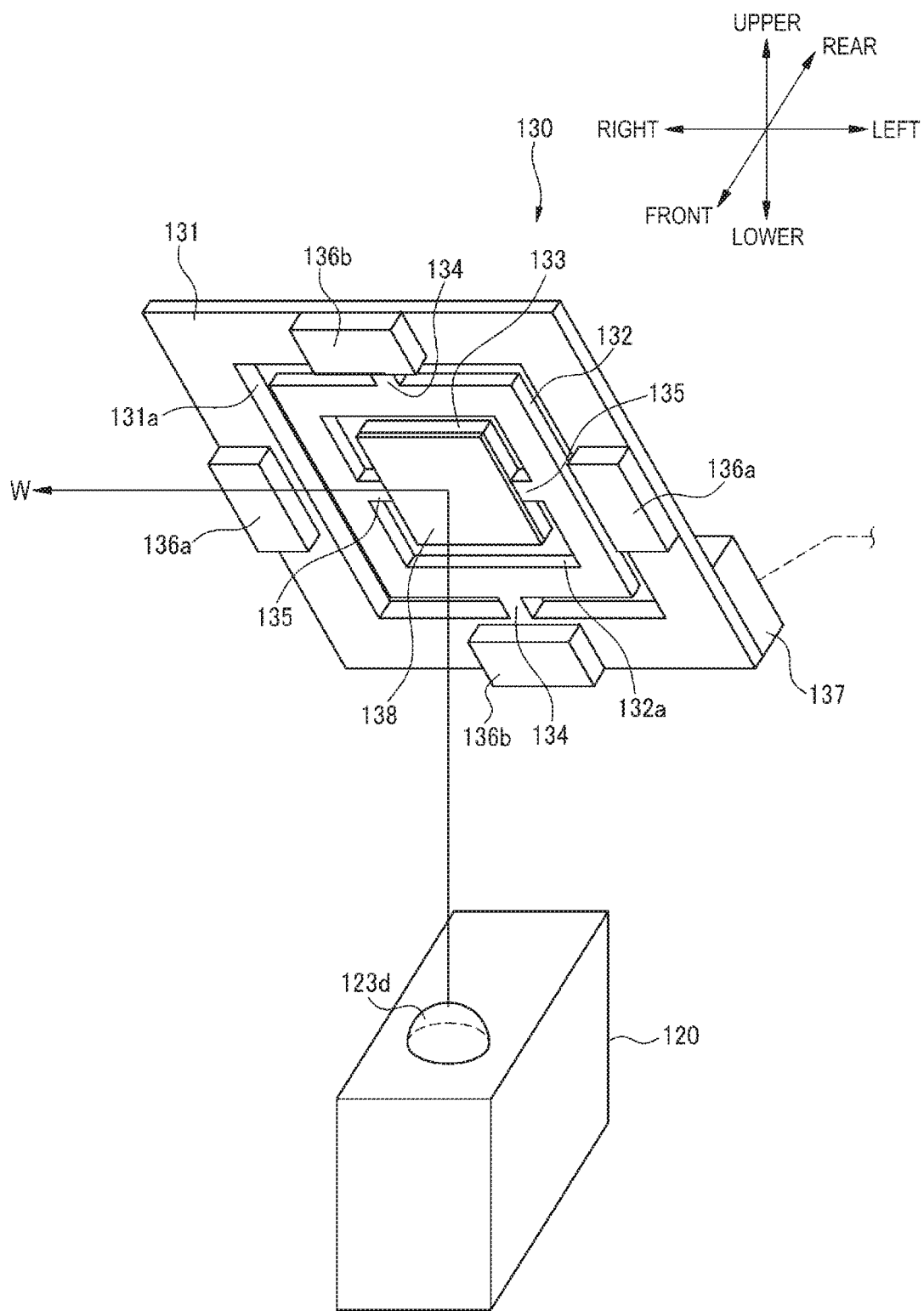
FIG. 5 is a perspective view showing a configuration of a light distribution unit of the road surface drawing lamp.

FIG. 5 is a perspective view when the light distribution unit 130 that constitutes the road surface drawing lamp 102 is observed from a front side. As shown in FIG. 5, the light distribution unit 130 includes a base 131, a first rotation body 132, a second rotation body 133, a first torsion bar 134, a second torsion bar 135, permanent magnets 136a and 136b, the terminal unit 137, and the reflection mirror 138. The light distribution unit 130 includes, for example, a galvanometer mirror. The light distribution unit 130 may include, for example, a MEMS mirror.

The base 131 is a frame body including an opening portion 131a at a center. The base 131 is fixed to the protruding portions 143 (see FIG. 3) in a state of being inclined in a front-rear direction of the road surface drawing lamp 102. The first rotation body 132 is disposed in the opening portion 131a of the base 131. The first rotation body 132 is a frame body including an opening portion 132a at a center. The first rotation body 132 is supported by the first torsion bar 134, which extends from a rear lower side to a front upper side of the road surface drawing lamp 102, to be rotatable left and right (vehicle width direction) with respect to the base 131.

The second rotation body 133 is disposed in the opening portion 132a of the first rotation body 132. The second rotation body 133 is a rectangular flat plate. The second rotation body 133 is supported by the second torsion bar 135, which extends in the vehicle width direction, to be rotatable upper and lower (in a vertical direction) with respect to the first rotation body 132. When the first rotation body 132 rotates left and right with the first torsion bar 134 serving as a rotation axis, the second rotation body 133 rotates left and right together with the first rotation body 132. The reflection mirror 138 is provided on a surface of the second rotation body 133 by plating, vapor deposition, or the like.

The base 131 is provided with a pair of permanent magnets 136a at a position orthogonal to an extending direction of the first torsion bar 134. The permanent magnets 136a form a magnetic field orthogonal to the first torsion bar 134. A first coil (not show is wired to the first rotation body 132. The first coil is connected to the lamp control unit 4 via the terminal unit 137. Further, the base 131 is provided with a pair of permanent magnets 136b at a position orthogonal to an extending direction of the second torsion bar 135. The permanent magnets 136b form a magnetic field orthogonal to the second torsion bar 135. A second coil (not shown) is wired to the second rotation body 133. The second coil is connected to the lamp control unit 4 via the terminal unit 137.

When a magnitude and a direction of a current that flows through the first coil and the second coil are controlled, the first rotation body 132 and the second rotation body 133 execute reciprocating rotation in a left-right direction, and the second rotation body 133 independently executes reciprocating rotation in an upper-lower direction. Accordingly, the reflection mirror 138 executes reciprocating rotation in upper-lower and left-right directions.

A positional relationship between the light source unit 120 and the light distribution unit 130 is determined such that the white laser light W emitted from the light source unit 120 is reflected by the reflection mirror 138 toward the front side of the road surface drawing lamp 102. The light distribution unit 130 scans a front side of the vehicle 1 with laser light by the reciprocating rotation of the reflection mirror 138. For example, the light distribution unit 130 scans a region where a drawing pattern is to be formed, with the laser light. Accordingly, a predetermined drawing pattern is formed at the front side of the vehicle 1 by irradiating a region where the drawing pattern is formed with the laser light.

Next, the vehicle lamp system 20 will be described using FIG. 2, and FIGS. 6 to 8.

As shown in FIG. 2, the vehicle lamp system 20 includes the ID lamp 150, the signaling lamps 160R and 160L, the road surface drawing lamp 102, and the lamp control unit 4 that controls these lamps 150, 160R, 160L, and 102.

The lamp control unit 4 is connected to the vehicle control unit 3. The lamp control unit 4 controls operations of the ID lamp 150, the signaling lamps 160R and 160L, and the road surface drawing lamp 102 based on a signal transmitted from the vehicle control unit 3.

As shown in FIG. 2, the vehicle lamp system 20 in the present embodiment is used together with the vehicle control unit 3 including an interference determination unit 21 and a mode determination unit 31. The vehicle lamp system 20 includes the lamp control unit, the road surface drawing lamp 102, the ID lamp 150, the right signaling lamp 160R, and the left signaling lamp 160L. In the following description, particularly when the right signaling lamp 160R and the left signaling lamp 160L are referred to without distinction, the right signaling lamp 160R and the left signaling lamp 160L, may be collectively referred to as signaling lamps 160.

Unlike the shown example, the vehicle lamp system may include a part of the vehicle control unit 3, or the vehicle lamp system may include the interference determination unit 21 and the mode determination unit 31.

The interference determination unit 21 determines whether a future course of the vehicle 1 calculated by the vehicle control unit 3 interferes with another vehicle.

The future course refers to a region to be passed by the vehicle 1 after a predetermined time has elapsed from present time. For example, the future course refers to a region to be passed by the vehicle 1 within 5 seconds from present time. Further, it is preferable that the future course refers to a region to be passed by the vehicle 1 within 3 seconds from present time. Further, the future course may be defined to refer to a region to be passed by the vehicle 1 within one second from present time. The vehicle control unit 3 calculates the future course based on information such as a current vehicle speed, a current advancing direction, timing of turning right or left acquired from navigation information, and timing of acceleration or deceleration.

The interference determination unit 21 determines whether a third party on a road, such as a person or another vehicle, exists on the future course. In the present embodiment, the interference determination unit 21 also calculates a future course of another vehicle, and determines whether the future course of the own vehicle and the future course of another vehicle interfere with each other. The future course of another vehicle may be acquired from another vehicle by the vehicle-to-vehicle communication. Alternatively, the vehicle control unit 3 may calculate a size and a speed of another vehicle based on an image from the camera 6 and may calculate the future course of another vehicle.

The mode determination unit 31 determines an "automatic driving mode" of another vehicle around the own vehicle 1 based on external information acquired by the vehicle control unit 3. In the present embodiment, the mode determination unit 31 determines whether the "automatic driving mode" of another vehicle is the "automatic driving mode" or the "manual driving mode".

Here, the "automatic driving mode" is a concept including the fully automatic driving mode and the advanced driving support mode. The "manual driving mode" is a concept including the driving support mode and the fully manual driving mode. The automatic driving mode and the manual driving mode are distinguished by determining whether the driver has the responsibility of driving the vehicle. In the fully automatic driving mode and the advanced driving support mode, the driver does not have the responsibility of driving, and the driver does not drive the vehicle. In the driving support mode and the fully manual driving mode, the driver has the responsibility of driving, the driver drives the vehicle, and the vehicle control unit 3 supports the driving performed by the driver.

The external information for determining the automatic driving mode of another vehicle includes, for example, information acquired by the vehicle-to-vehicle communication, a label or display attached to another vehicle, an image of another vehicle (existence or absence of a driver, a type of the vehicle, and the like), the behavior of another vehicle, ID information such as a license number, and intranet information acquired from an infrastructure.

The mode determination unit 31 does not determine whether the vehicle can execute the automatic driving mode. Even in a vehicle that can execute the automatic driving mode, the fully manual driving mode may be executed. The mode determination unit 31 determines a driving mode executed by another vehicle at that time.

Figure 6:
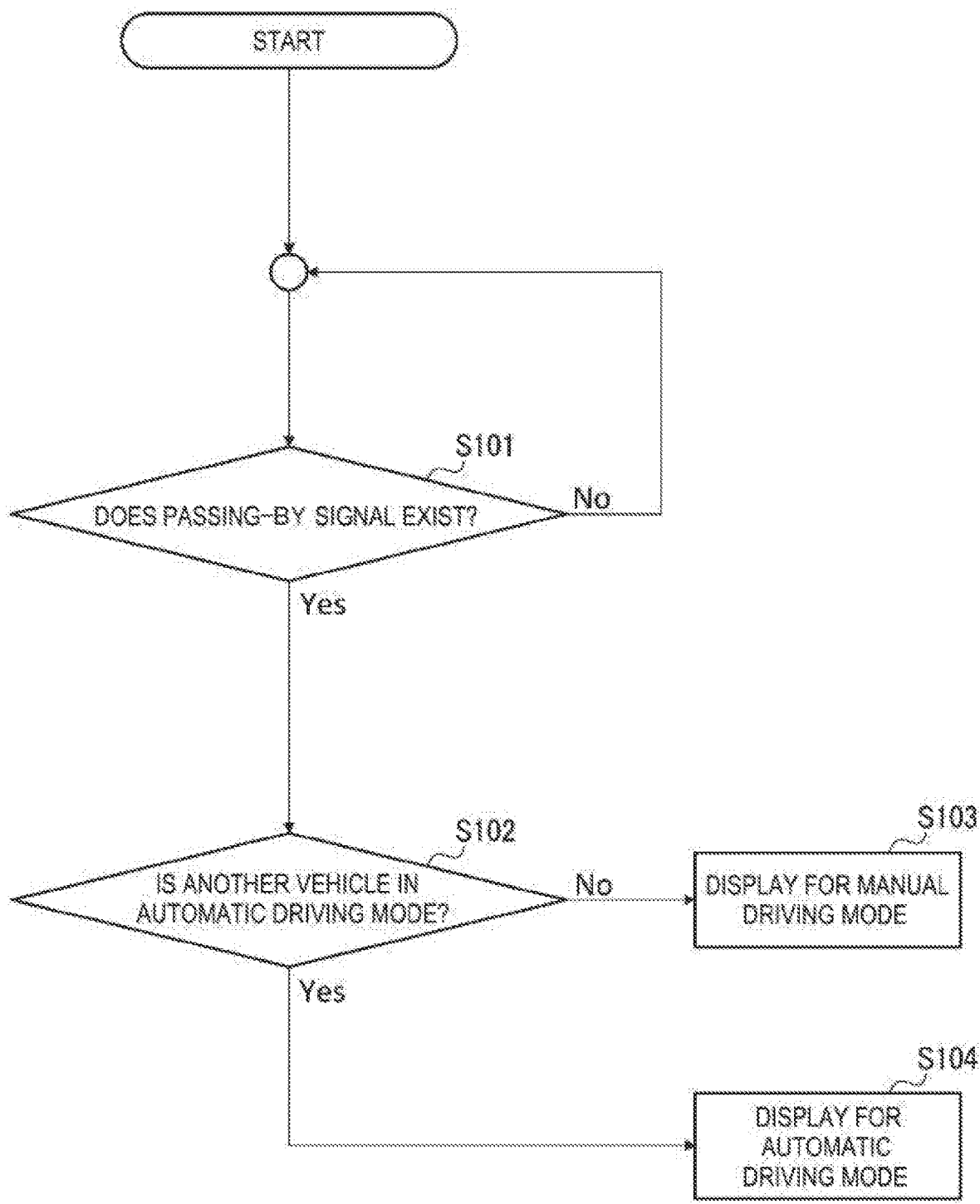
FIG. 6 is a flowchart executed by the vehicle lamp system when the vehicle and an oncoming vehicle pass by each other.
Figure 7:
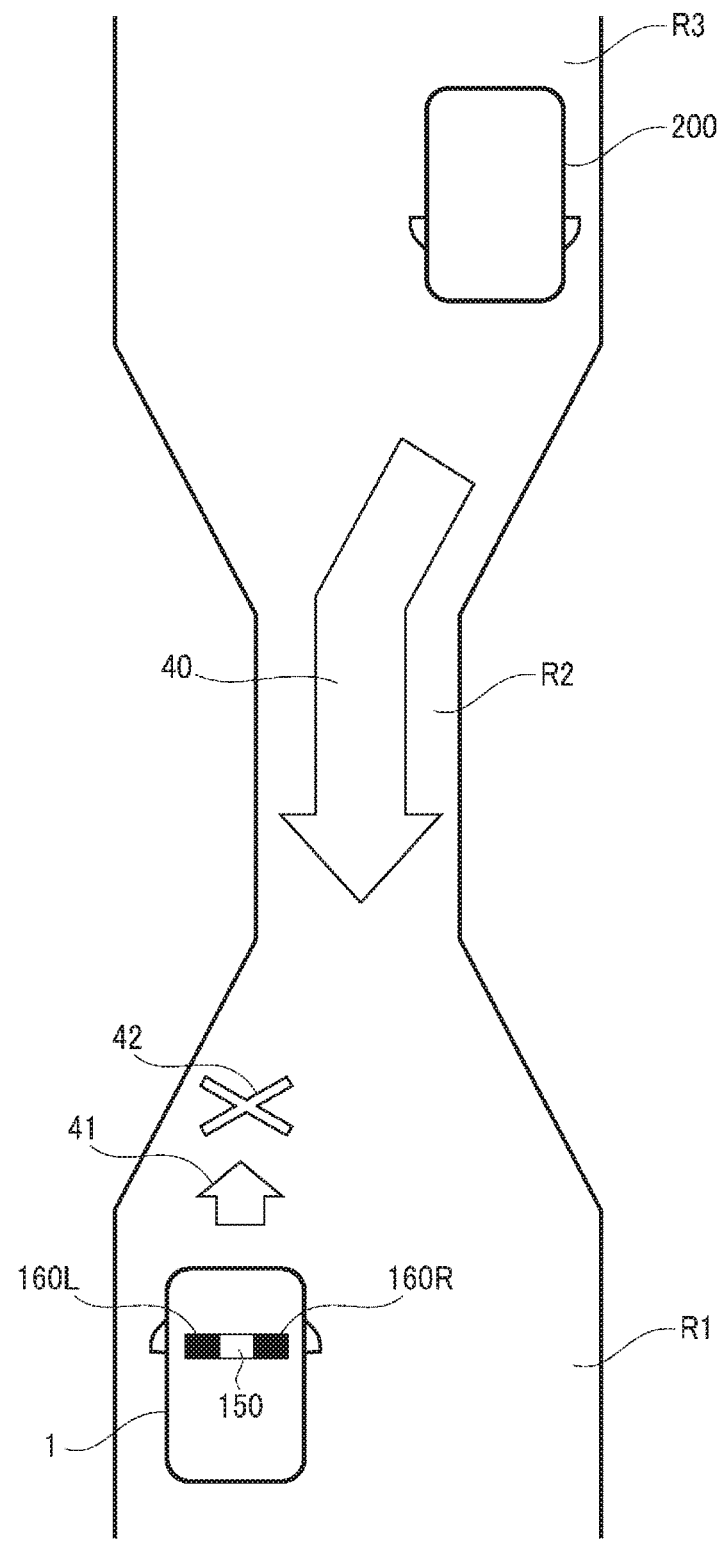
FIG. 7 shows an example of road surface drawing displayed for the oncoming vehicle in a manual driving mode.
Figure 8:
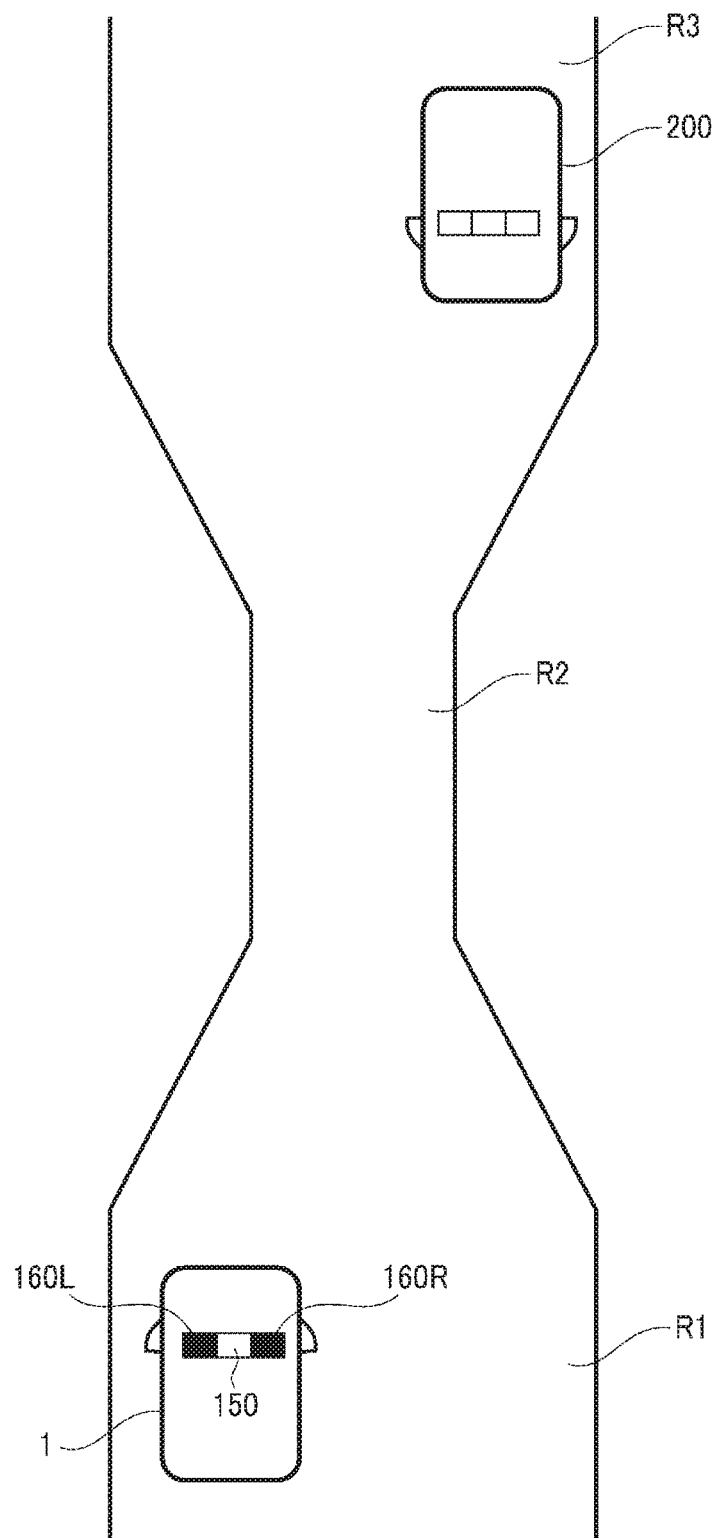
FIG. 8 shows an example of road surface drawing displayed for the oncoming vehicle in an automatic driving mode.

Next, an operation example of the vehicle lamp system 20 will be described with reference to FIGS. 6 to 8. FIG. 6 is a flowchart executed by the lamp control unit 4 when the vehicle 1 and an oncoming vehicle 200 pass by each other. Further. FIG. 7 shows an example of road surface drawing displayed toward the oncoming vehicle 200 in the manual driving mode. FIG. 8 shows an example of road surface drawing displayed toward the oncoming vehicle 200 in the automatic driving mode.

FIGS. 7 and 8 show a situation where the vehicle 1 that travels on a road R1 in the automatic driving mode approaches a narrow road R2, and the oncoming vehicle 200 travels on a road R3 ahead of the narrow road R2.

The vehicle control unit 3 of the vehicle 1 calculates a future course of the vehicle 1 based on external information acquired from the sensor 5, the camera 6, the GPS 9, the wireless communication unit 10, the map information storage unit 11, and the like. In the shown example, the future course of the vehicle 1 is a course from the road R1, being currently traveled by the vehicle 1, through the narrow road R2, and to the road R3 ahead of the road R2.

The vehicle control unit 3 calculates a future course of the oncoming vehicle 200 based on the same external information. In the shown example, the future course of the oncoming vehicle 200 is a course from the road R3, through the narrow road R2, and to the road R1.

The vehicle control unit 3 acquires traveling information of the oncoming vehicle 200 and road information of the narrow road R2 from the same external information. For example, the traveling information includes a vehicle width of the oncoming vehicle 200 and the like, and the road information includes a road width of the narrow road R2 and the like. The vehicle control unit 3 transmits these pieces of calculated and acquired information (the future course, the traveling information, the road information, and the like) to the interference determination unit 21.

The interference determination unit 21 determines whether the own vehicle 1 and the oncoming vehicle 200 interfere with each other on the future course. The interference determination unit 21 determines the existence or absence of interference based on the future course of the own vehicle 1, the future course of another vehicle 200, relative speed between the own vehicle 1 and another vehicle 200, and the like. When determining that there is the interference, the interference determination unit 21 transmits a "passing-by signal" indicating that the vehicle 1 and the oncoming vehicle 200 interfere with each other to the lamp control unit 4.

The mode determination unit 31 is configured to receive the external information from the vehicle control unit 3, and determines an automatic driving mode (automatic driving mode or manual driving mode) of the oncoming vehicle 200 based on the received external information. The mode determination unit 31 transmits a determination result to the lamp control unit 4.

The lamp control unit 4 determines whether the passing-by signal has been transmitted from the interference determination unit 21 (step S101).

When determining that the passing-by signal has not been transmitted (step S101: No), the lamp control unit 4 repeats the processing of step S101 until the passing-by signal is transmitted.

When determining that the passing-by signal has been transmitted (step S101: Yes), the lamp control unit 4 determines whether a driving mode of the oncoming vehicle 200 is the automatic driving mode based on the determination result of the automatic driving mode transmitted from the mode determination unit 31 (step S102).

When determining that the driving mode of the oncoming vehicle 200 is not the automatic driving mode (step S102: No), the lamp control unit 4 controls the road surface drawing lamp 102 to execute a display for the manual driving mode shown in FIG. 7 (step S103).

FIG. 7 shows an example of road surface drawing for the manual driving mode. As shown in FIG. 7, the display for the manual driving mode is a display that enables recognition of an intention of the vehicle 1 when a driver of the oncoming vehicle 200 who is driving in the manual driving mode sees with eyes.

In FIG. 7, an arrow 40 extending from an oncoming vehicle 200-side to a vehicle 1-side is drawn on a road surface. The arrow 40 shows the intention of the vehicle 1 to the oncoming vehicle 200 such as "I will yield a road" and "please go ahead".

Further, in FIG. 7, an arrow 41 and a cross mark 42 are also displayed. The arrow 41 shows an advancing direction of the own vehicle 1 in the vicinity of the front side of the own vehicle 1 in a short way. The cross mark 42 is drawn ahead of the arrow 41. The arrow 41 and the cross mark 42 show the intention of the own vehicle 1 such as "own vehicle 1 is stopped at this location" or "please go ahead" to the oncoming vehicle 200.

On the contrary, when determining that the oncoming vehicle 200 is in the automatic driving mode in step S102 (step S102: Yes), the lamp control unit 4 controls the road surface drawing lamp 102 to execute the display for the automatic driving mode (step S104).

The display for the automatic driving mode is a display suitable for the oncoming vehicle 200 that travels in the automatic driving mode. For the oncoming vehicle 200 that can execute the vehicle-to-vehicle communication and that is in the automatic driving mode, rather than transmitting the intention of the own vehicle 1 by displaying with the lamp to the oncoming vehicle 200, it is more accurate to directly transmit the intention of the own vehicle 1 to the oncoming vehicle 200 by the vehicle-to-vehicle communication. Therefore, as shown in FIG. 8, in the present embodiment, nothing is drawn by the road surface drawing lamp 102 as the display for the automatic driving mode.

Effects

As described above, there is a case where it is desired to convey the intention of the own vehicle 1 to the oncoming vehicle 200, for example, how the own vehicle is about to execute driving with respect to the oncoming vehicle. In such a case, in a situation where a vehicle that is executing the automatic driving mode and a vehicle that is executing the manual driving mode coexist, it is necessary to select an appropriate method for displaying the intention in accordance with the respective vehicles. For example, even when a gesture such as "go ahead" is executed toward the vehicle that is executing the automatic driving mode, an intention of the "go ahead" may not be conveyed accurately.

According to the vehicle lamp system 20 in the present embodiment, a driving mode of another vehicle 200 is determined, and the road surface drawing lamp 102 is controlled in a different form in accordance with the determined driving mode, that is, whether the oncoming vehicle 200 is in the automatic driving mode or the manual driving mode. Therefore, even in a situation where the vehicle that is executing the automatic driving mode and the vehicle that is executing the manual driving mode coexist, the intention of the own vehicle 1 can be accurately conveyed to another vehicle 200.

Unlike the present embodiment, the lamp control unit 4 may control the road surface drawing lamp 102 to execute some display as the display for the automatic driving mode. For example, when a road surface is caused to blink with the green light at a constant cycle between the own vehicle 1 and the oncoming vehicle 200, it means that the own vehicle 1 yields a course. When such an agreement is made between the own vehicle 1 and another vehicle 200, the road surface drawing lamp 102 may be operated in accordance with the agreement.

Although an example in which the lamp control unit 4 changes the control form of the road surface drawing lamp 102 in accordance with the driving mode of another vehicle 200 has been described in the above description, the present invention is not limited thereto. The lamp control unit 4 may control control aspects of the ID lamp 150 and the signaling lamps 160 differently in accordance with the driving mode of another vehicle 200.

In the present embodiment, as the display for the manual driving shown in FIG. 7, the right signaling lamp 160R and the left signaling lamp 160L are continuously turned on. It is assumed that the right signaling lamp 160R and the left signaling lamp 160L are normally turned off, by continuously turning on the right signaling lamp 160R and the left signaling lamp 160L, it is possible to convey to the oncoming vehicle 200 in the manual driving mode that a situation is not normal.

In the present embodiment, as the display for the automatic driving shown in FIG. 8, the right signaling lamp 160R and the left signaling lamp 160L blink. In this case, when another vehicle 200 is executing the automatic driving mode, and the right signaling lamp 160R and the left signaling lamp 160L blink, it is assumed that an agreement on yielding a road is made. When such an agreement is made, an intention of yielding a road to another vehicle 200 by the own vehicle 1 can also be transmitted by such a display.

In the present embodiment, the vehicle lamp system 20 executes a display by causing the road surface drawing lamp 102 and the signaling lamps 160 to be in conjunction with each other. Therefore, in particular, it is easy to pay attention to another vehicle 200 that is executing the manual driving mode, which is effective.

Although it is assumed that there is one oncoming vehicle in the above operation example, the present invention is not limited thereto. When there are a plurality of oncoming vehicles ahead of the narrow road, a display in accordance with a driving mode of a leading vehicle may be executed every time the leading vehicle changes. Alternatively, for example, when driving modes of three vehicles are determined from the leading vehicles, and at least one vehicle is in the manual driving mode, the display for the manual driving mode may be executed.

Other Operation Examples

In the embodiment described above, although an example is described in which a display aspect is switched when the own vehicle 1 and the oncoming vehicle 200 pass by each other on the narrow road R2, the present invention is not limited to this example. Next, other operation examples of the vehicle lamp system 20 will be described with reference to FIGS. 9 to 11. An operation example of the vehicle lamp system 20 when the own vehicle changes a lane will be described with reference to FIGS. 9 to 11.

Figure 9:
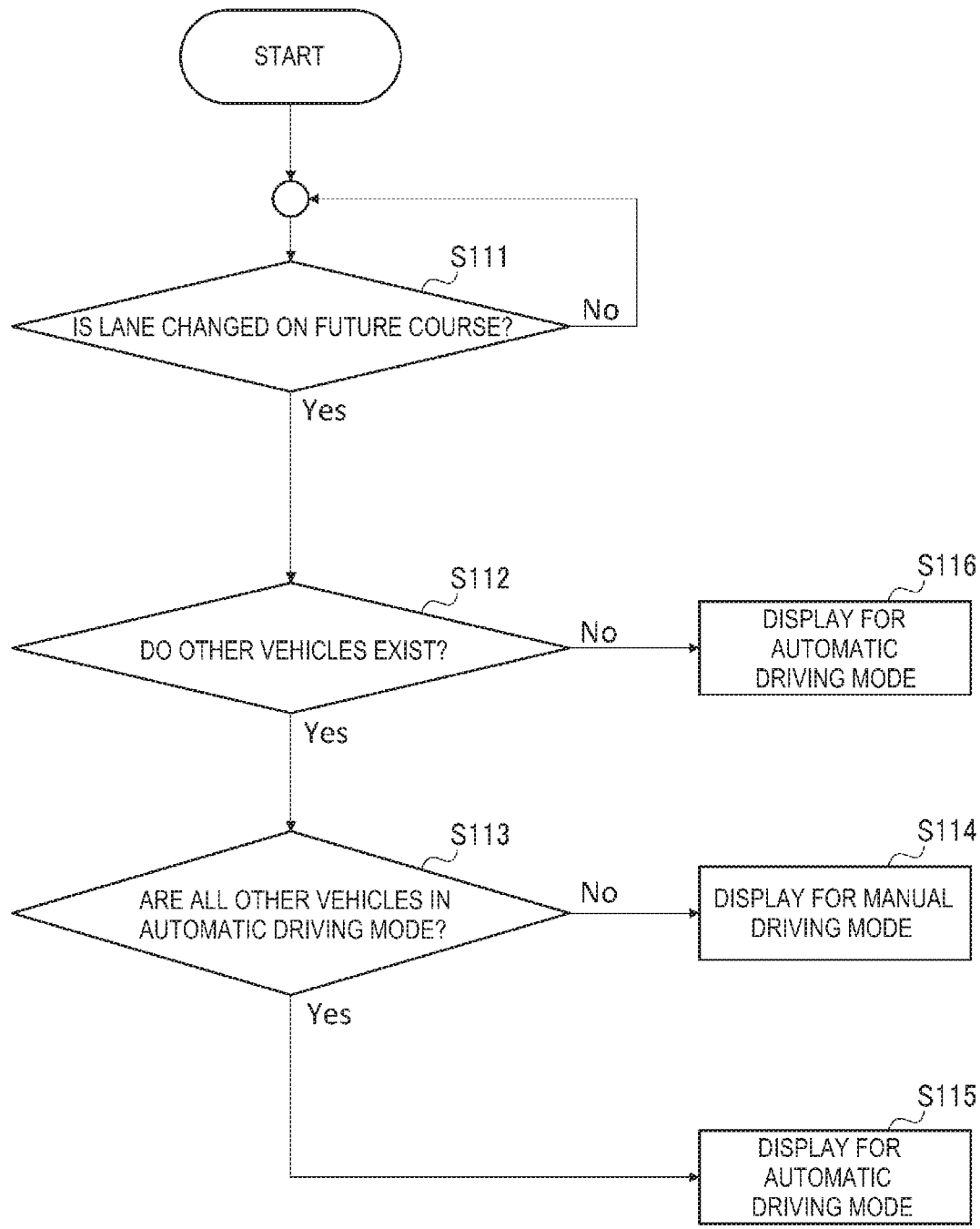
FIG. 9 is a flowchart executed by the vehicle lamp system when a lane is changed.
Figure 10:
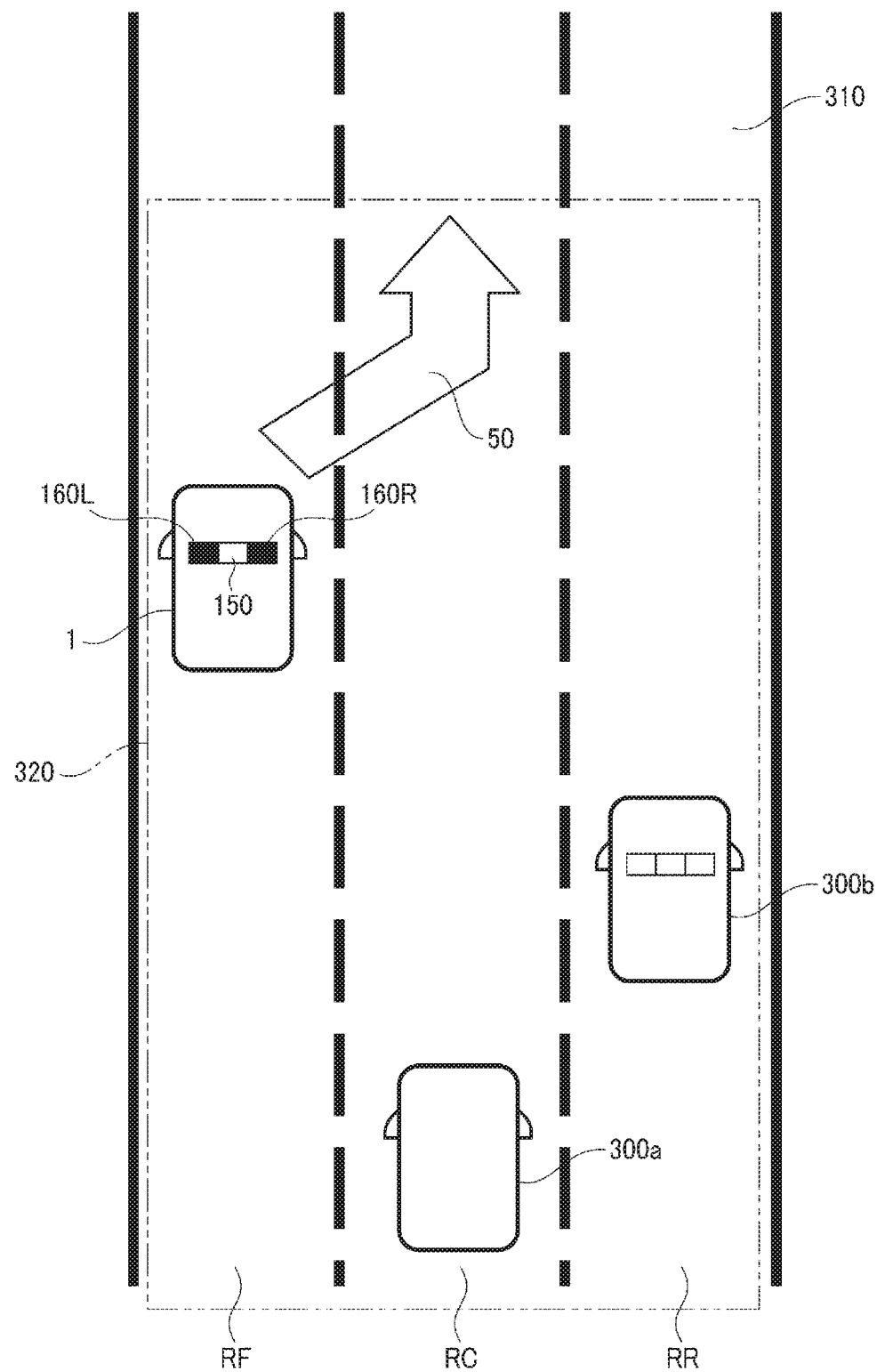
FIG. 10 shows an example of road surface drawing displayed when another vehicle is in the manual driving mode.
Figure 11:
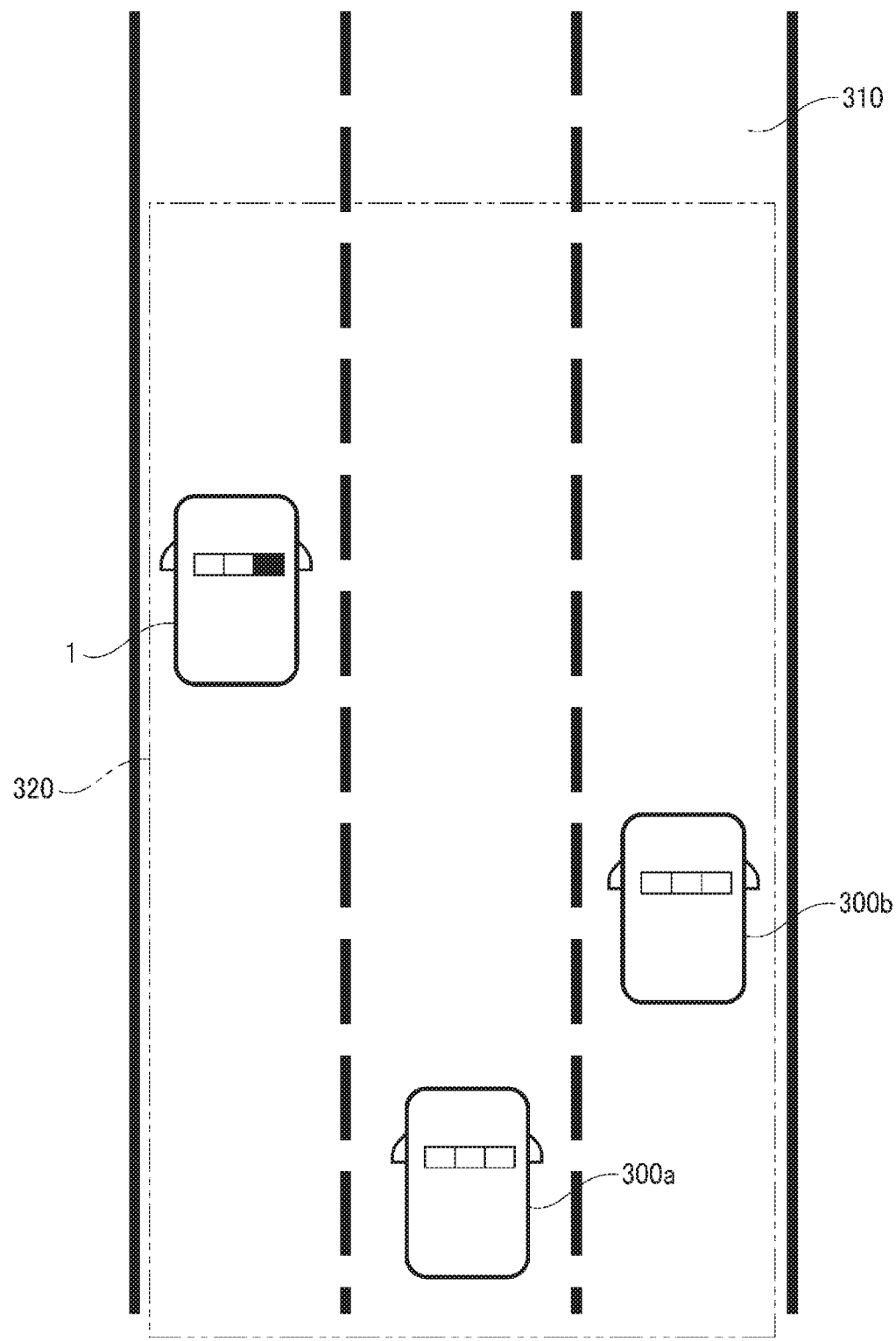
FIG. 11 shows an example of road surface drawing displayed when other vehicles are in the automatic driving mode.

FIG. 9 is a flowchart executed by the vehicle lamp system 20 when the vehicle 1 changes the lane. FIG. 10 is a diagram showing a display for the manual driving mode. FIG. 11 is a diagram showing a display for the automatic driving mode.

In FIG. 10, the own vehicle 1 travels on a left lane RF at a left end of a road including three lanes. It is assumed that the own vehicle 1 needs to change a lane to a central lane RC for reasons such as turning right at an intersection ahead or merging the left lane RF into the central lane RC at a center in the future. At this time, it is assumed that (i) another vehicle 300*a* that travels on the central lane RC and (ii) another vehicle 300*b* that travels on a right lane RR at a right end exist around the own vehicle 1.

When the vehicle control unit 3 determines to change a lane from the left lane RF to the central lane RC, the vehicle control unit 3 calculates a future course. The vehicle control unit 3 transmits the calculated future course to the interference determination unit 21 of the vehicle lamp system 20. The vehicle control unit 3 determines to change a lane on the future course (step S111: Yes).

When the vehicle control unit 3 determines to change the lane on the future course (step S111: Yes), the vehicle control unit 3 then determines whether other vehicles 300*a* and 300*b* exist in a predetermined region 320 around the vehicle 1 (step S112). The predetermined region 320 means a traveling region of other vehicles 300*a* and 300*b* affected by driving when the vehicle 1 changes the lane. For example, there is the predetermined region 320 that is shown in FIGS. 10 and 11, that is surrounded by a two-dot chain line, and that covers lateral sides, a rear side, and a front side of the vehicle 1.

When the vehicle control unit 3 determines that other vehicles 300*a* and 300*b* do not exist in the predetermined region 230 (step S112: No), the vehicle control unit 3 transmits a signal to the lamp control unit 4 to execute the display for the automatic driving mode (step S116). The display for the automatic driving mode is a display that does not require that an intention of the own vehicle 1 is understood by another person by seeing. When other vehicles 300*a* and 300*b* do not exist in a predetermined range 230, it is not necessary to actively transmit an intention to another person. Therefore, in the present embodiment, when other vehicles 300*a* and 300*b* do not exist in the predetermined region 320, the display for the automatic driving mode shown in FIG. 11 is executed.

When the vehicle control unit 3 determines that other vehicles 300*a* and 300*b* exist in the predetermined region 320 (step S112: Yes), the mode determination unit 31 determines whether all other vehicles 300*a* and 300*b* are in the automatic driving mode (step S113).

In FIG. 10, it is assumed that another vehicle 300*a* is the manual driving mode and another vehicle 300*b* is in the automatic driving mode. When the mode determination unit 31 determines that at least one of other vehicles 300*a* and 300*b* is in the manual driving mode (step S113: No), the vehicle control unit 3 transmits a signal to the lamp control unit 4 to execute the display for the manual driving mode (step S114). When receiving the signal, the lamp control unit 4 controls the road surface drawing lamp 102 to execute the road surface drawing shown in FIG. 10.

As shown in FIG. 10, the display for the manual driving mode is, for example, a display that allows a driver of another vehicle 300*a*, which travels in the manual driving mode, to recognize an intention to change a lane of the vehicle 1 when the driver sees the display with eyes. In the shown example, as the display for the manual driving mode, an arrow 50, directed from the left lane RF to the central lane RC to which a lane is changed, is drawn on a road surface on a right front side of the vehicle 1.

On the contrary, when it is determined that all other vehicles 300*a* and 300*b* are in the automatic driving mode in step S113 (step S113: Yes), the vehicle control unit 3 transmits a signal for executing the display for the automatic driving mode to the lamp control unit 4 (step S115). When receiving the signal, the lamp control unit 4 controls the road surface drawing lamp 102 to execute the display for the automatic driving mode shown in FIG. 11.

FIG. 11 shows the display for the automatic driving mode. It is assumed that other vehicles 300*a* and 300*b* in FIG. 11 are traveling in the automatic driving mode. As shown in FIG. 11, as the display for the automatic driving mode, the lamp control unit 4 causes the road surface drawing lamp 102 to display nothing. As described with reference to FIG. 8, an intention can be transmitted, by the vehicle-to-vehicle communication, to other vehicles 300*a* and 300*b* that travel in the automatic driving mode. Therefore, the display in which the road surface drawing lamp 102 is used does not transmit the intention.

As in the present embodiment, when all other vehicles 300*a* and 300*b* in the predetermined region 320 are in the automatic driving mode, it is preferable to execute the display for the automatic driving mode. This is because although the intention of the own vehicle 1 can be conveyed, by the vehicle-to-vehicle communication and the like, to other vehicles 300*a* and 300*b* that are executing the automatic driving mode, the display based on the lamp can most effectively convey the intention to another vehicle 300*a* that is executing the manual driving mode.

However, the display may be executed in accordance with the driving modes of other vehicles 300*a* and 300*b* most affected by the lane change of the own vehicle 1, in this example, the driving mode of another vehicle 300*a* positioned on the central lane RC.

Similar to the description of FIG. 8, also in the present operation example, the lamp control unit 4 controls the road surface drawing lamp 102 and the signaling lamps 160 in conjunction with each other. In the present operation example, as shown in FIG. 10, the lamp control unit 4 causes the road surface drawing lamp 102 to display the arrow 50 and causes the right signaling lamp 160R to blink as the display for the manual driving mode. As shown in FIG. 11, as the display for the automatic driving mode, the arrow 50 is not displayed by the road surface drawing lamp 102 and the right signaling lamp 160R is continuously turned on.

Although the embodiment of the present invention has been described, it is needless to say that the technical scope of the present invention should not be interpreted as being limited to the description of the present embodiment. The embodiment is a mere example, and those skilled in the art will understand that the embodiment can be variously changed within the scope of the invention as described in the claims. The technical scope of the present invention should be determined based on the scope of the invention described in the claims and the scope of equivalents thereof.

In the embodiment described above, the mode determination unit 31 determines whether a driving mode is (i) the automatic driving mode including the fully automatic driving mode and the advanced driving support mode, or (ii) the manual driving mode including the driving support mode and the fully manual driving mode. However, the present invention is not limited thereto.

For example, the mode determination unit 31 may determine the fully automatic driving mode, the advanced driving support mode, the driving support mode, and the fully manual driving mode. The lamp control unit 4 may control the road surface drawing lamp 102 in aspects different from each other in accordance with the respective modes.

Alternatively, the mode determination unit 31 may determine (i) a first mode including the fully automatic driving mode, the advanced driving support mode, and the driving support mode, and (ii) the fully manual driving mode. The lamp control unit 4 may control the road surface drawing lamp 102 in aspects different from each other in accordance with the first mode and the fully manual driving mode.

In the embodiment described above, an example has been described in which the display for the automatic driving mode and the display for the manual driving mode are executed using the road surface drawing lamp 102 and the signaling lamps 160. However, the present invention is not limited thereto. For example, in addition to these lamps, the ID lamp 150, the headlamp 101, a turn signal lamp, an inter-vehicle lamp, and the like may be used for display. When these lamps are used, a lighting color, a blinking cycle, an irradiation range, and the like may be different between the display for the automatic driving mode and the display for the manual driving mode.

In the embodiment described above, an example has been described in which the arrow 41, the cross mark 42, the arrow 50, and the like are displayed by the road surface drawing lamp 102. However, the present invention is not limited to these graphics. Shapes, colors, sizes, the number, and the like of the graphics are not limited to those shown in the drawings as long as the graphics can transmit the intention of the own vehicle 1 to another vehicle.

In the embodiment described above, although an operation example when passing the narrow road or changing the lane has been described, the present invention is not limited thereto. The present invention is effective when it is desired to convey the intention of the own vehicle to another vehicle, for example, when the vehicle 1 is turned right or left, or when a sudden brake is operated.

In the above description, although the automatic driving mode is classified into two modes: the "automatic driving mode" and the "manual driving mode", the present invention is not limited thereto. For example, the automatic driving mode may be classified into each of the fully automatic driving mode, the advanced driving support mode, the driving support mode, and the fully manual driving mode.

In the above description, it is assumed that the lamp control unit 4 is mounted on the lamp unit 100, and the vehicle lamp system 20 is configured as an independent system different from the vehicle system 2. However, the present invention is not limited to this configuration. For example, the vehicle lamp system may be configured as a system including the vehicle control unit 3. Alternatively, the vehicle lamp system may be configured as a system including, for example, the camera, the sensor, the radar, and the like that are connected to the vehicle system 2. Further, the lamp control unit 4 may be configured as a part of the ECU that constitutes the vehicle control unit 3. In this case, the lamp control unit 4 is mounted on the vehicle 1 instead of the lamp unit 100.

In the present embodiment, although the driving mode of the vehicle has been described as including the fully automatic driving mode, the advanced driving support mode, the driving support mode, and the fully manual driving mode, the driving mode of the vehicle should not be limited to these four modes.

Classification and a display aspect of the driving mode of the vehicle may be appropriately changed in accordance with laws or rules on automatic driving in each country. Similarly, definitions of the "fully automatic driving mode", the "advanced driving support mode", and the "driving support mode" described in the description of the present embodiment are merely examples, and these definitions may be appropriately changed in accordance with laws or rules on the automatic driving in each country.

This application is based on Japanese Patent Application 2017-202458, filed on Oct. 19, 2017, and the contents of which are incorporated herein by reference.

INDUSTRIAL APPLICABILITY

According to the present invention, it is possible to provide the vehicle lamp system that can be suitably used in the situation where the automatic driving vehicle and the manual driving vehicle coexist on the public road.

REFERENCE SIGNS LIST

1 vehicle
2 vehicle system
3 vehicle control unit
4 lamp control unit
20 vehicle lamp system
21 interference determination unit
31 mode determination unit
40, 41, 50 arrow
102 road surface drawing lamp (an example of a lamp)
150 ID lamp (an example of a lamp)
160R, 160L signaling lamp (an example of a lamp)

The invention claimed is:

1. A vehicle lamp system configured to be used together with a vehicle control unit configured to control a traveling state of a vehicle and with a mode determination unit configured to determine an automatic driving mode of another vehicle, the vehicle lamp system comprising:
a lamp configured to be mounted on the vehicle; and
a lamp control unit configured to control the lamp in a different aspect in accordance with a mode signal output by the mode determination unit,
wherein the mode determination unit determines an automatic driving mode of the another vehicle that exists in a predetermined region on lateral sides and a rear side of the vehicle when the vehicle changes a lane, and
wherein the lamp control unit controls the lamp in a different aspect in accordance with the mode signal output by the mode determination unit when the vehicle changes the lane.

2. The vehicle lamp system according to claim 1, wherein the mode determination unit determines the automatic driving mode based on external information acquired by the vehicle control unit.

3. The vehicle lamp system according to claim 2, wherein the external information comprises information acquired by vehicle-to-vehicle communication.

4. The vehicle lamp system according to claim 2, wherein the external information comprises identification information of the another vehicle.

5. The vehicle lamp system according to claim 2, wherein the external information comprises intranet information acquired from an infrastructure.

6. The vehicle lamp system according to claim 2, wherein the vehicle control unit calculates a future course of the another vehicle based on the external information.

7. A vehicle lamp system configured to be used together with a vehicle control unit configured to control a traveling state of a vehicle and with a mode determination unit configured to determine an automatic driving mode of another vehicle, the vehicle lamp system comprising:
- a lamp configured to be mounted on the vehicle;
- a lamp control unit configured to control the lamp in a different aspect in accordance with a mode signal output by the mode determination unit; and
- an interference determination unit configured to determine whether a future course of the vehicle calculated by the vehicle control unit interferes with the another vehicle, wherein
- the lamp control unit controls the lamp in a different aspect in accordance with the mode signal output by the mode determination unit when the interference determination unit outputs a passing-by signal, the passing-by signal being output when the interference determination unit determines that the vehicle and the another vehicle interfere with each other on the future course when the vehicle and the another vehicle pass by each other.

8. The vehicle lamp system according to claim 7, wherein the mode determination unit determines the automatic driving mode based on external information acquired by the vehicle control unit.

9. The vehicle lamp system according to claim 8, wherein the external information comprises information acquired by vehicle-to-vehicle communication.

10. The vehicle lamp system according to claim 8, wherein the external information comprises identification information of the another vehicle.

11. The vehicle lamp system according to claim 8, wherein the external information comprises intranet information acquired from an infrastructure.

12. The vehicle lamp system according to claim 8, wherein at least one of the vehicle control unit and the interference determination unit calculates a future course of the another vehicle based on the external information.

* * * * *